April 23, 1940.   C. C. FARMER   2,198,028
BRAKE MECHANISM
Filed Dec. 27, 1938   2 Sheets-Sheet 1

INVENTOR
CLYDE C. FARMER
BY
ATTORNEY

April 23, 1940.  C. C. FARMER  2,198,028
BRAKE MECHANISM
Filed Dec. 27, 1938   2 Sheets-Sheet 2

INVENTOR
CLYDE C. FARMER
BY
A. M. Higgins
ATTORNEY

Patented Apr. 23, 1940

2,198,028

UNITED STATES PATENT OFFICE 2,198,028

BRAKE MECHANISM

Clyde C. Farmer, Pittsburgh, Pa., assignor to The Westinghouse Air Brake Company, Wilmerding, Pa., a corporation of Pennsylvania Application December 27, 1938, Serial No. 247,761

11 Claims. (Cl. 188—264)

This invention relates to drum brake mechanisms and more particularly to that type of drum brake mechanism in which there is employed a rotatable brake drum having an external friction braking face which may be straight or any other suitable shape across its width and which is adapted to be frictionally engaged by one or more friction braking elements to produce braking action.

The principal object of the invention is to provide an improved drum brake mechanism of the above mentioned type.

Another object of the invention is to provide an improved air cooling system for drum brake mechanisms of the above mentioned type.

Another object of the invention is to provide a drum brake mechanism of the above mentioned type with means for maintaining the friction face of the drum free of loose particles worn from the interengaging friction faces of the drum and brake element or elements during braking.

A further object of the invention is to provide a brake drum for a brake mechanism of the above mentioned type with a friction face which is so formed that it will take care of the surface thermal expansion or surface tension of the face in such a manner as to minimize the possibility of surface checking or cracking thereof.

A still further object of the invention is to provide a drum brake mechanism of the above mentioned type with an air cooling system for dissipating heat from the mechanism and to provide means whereby the system is rendered effective upon the initiation of a brake application and during such application, and whereby the system is cut out of action upon the subsequent release of the brakes so as to prevent the system from acting to unduly oppose the motivating power applied to any of the driven parts associated with the brake mechanism.

Other objects and advantages will appear in the following more detailed description of the invention.

Figure 1:
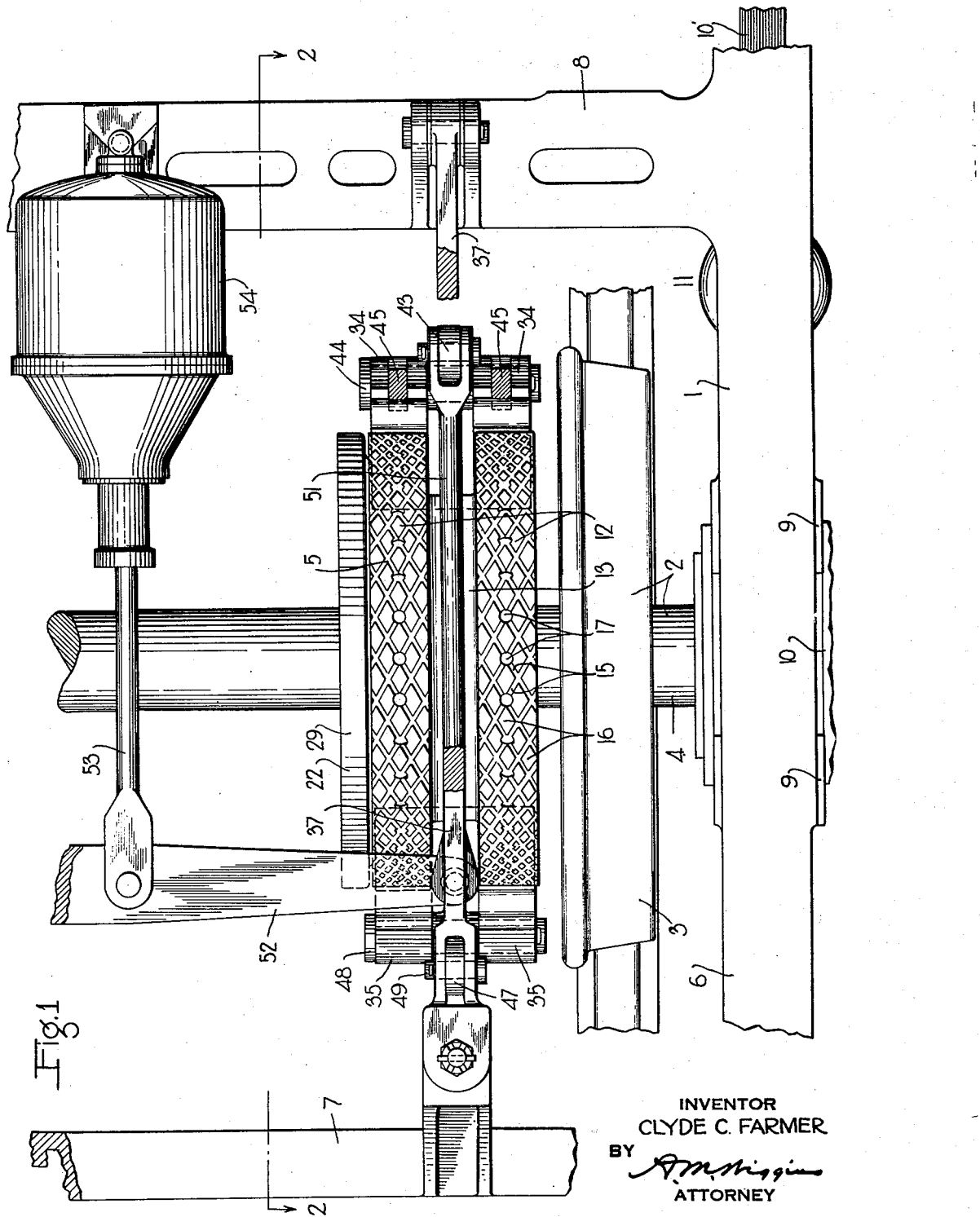
Figure 2:
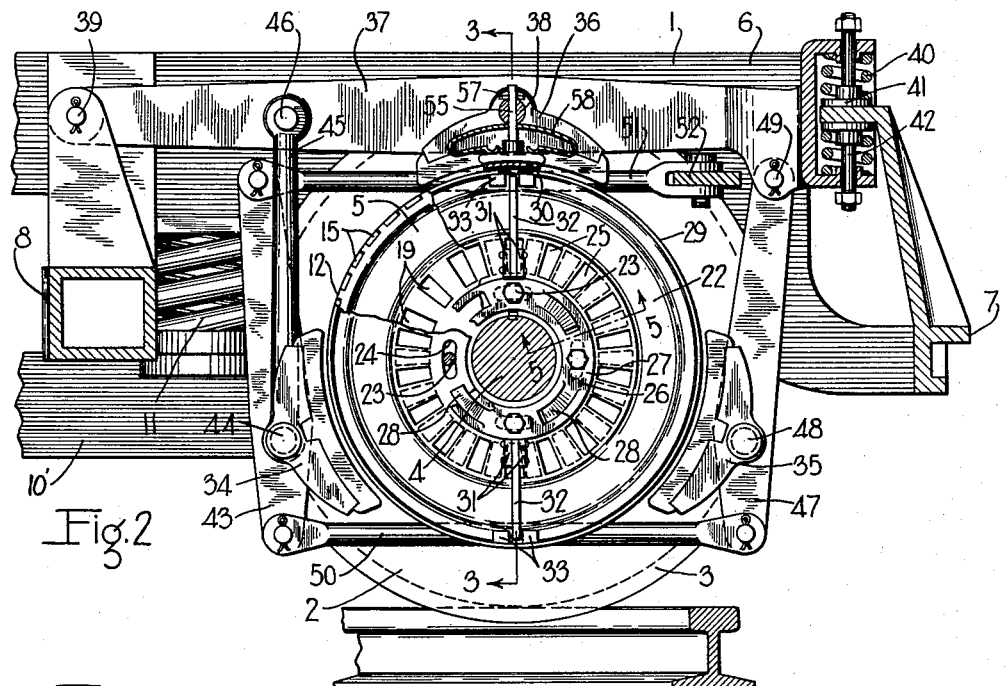
Figure 3:
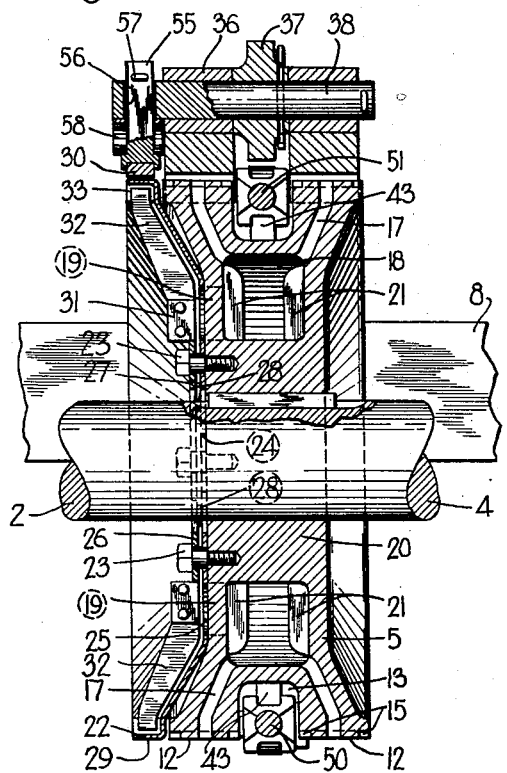
Figure 4:
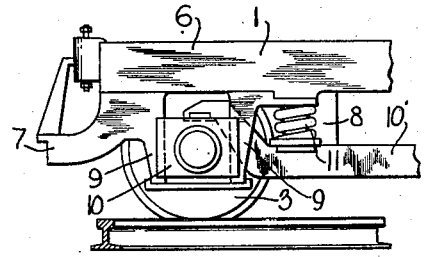
Figure 5:
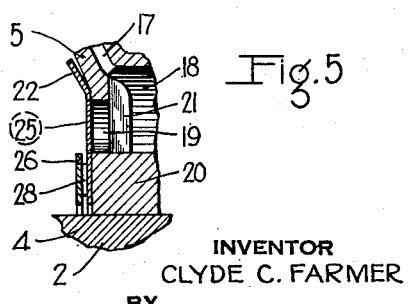

In the accompanying drawings Fig. 1 is a plan view of a portion of railway vehicle truck embodying the invention; Fig. 2 is a longitudinal sectional view of the same taken on the line 2—2 of Fig. 1; Fig. 3 is a fragmentary vertical sectional view taken on the line 3—3 of Fig. 2; Fig. 4 is a side elevational view of the vehicle truck, the view being made on a reduced scale; and Fig. 5 is a fragmentary sectional view taken on the line 5—5 of Fig. 2.

In the drawings the invention is shown embodied in a drum brake mechanism of the type particularly adapted for use in railway vehicle trucks and the following description will be more or less directed to this type of mechanism.

The vehicle truck may comprise a truck frame 1 which is spring supported in the usual manner by two or more wheel and axle assemblies 2, only a portion of the truck frame and a portion of one wheel and axle assembly being shown as these portions are all that are deemed necessary to a clear understanding of the invention.

Each wheel and axle assembly may comprise the usual laterally spaced truck wheels 3 which are connected together in the usual manner by an axle 4, and secured to the axle for rotation therewith are laterally spaced brake drums 5 which are located between the wheels and arranged one adjacent each wheel, only one of such wheels and the adjacent brake drum being shown in the drawings.

The truck frame shown is of the cast metal type having at each side a side frame 6, a transversely extending end piece 7 at each end of the truck frame and a pair of spaced transversely extending transoms 8 located intermediate the ends of the side frame, only one of which transoms is shown. Each side frame has at each of its ends spaced pedestal jaws 9 between which a journal box 10 for the axle is mounted. Interposed between and engaging the upper surface of the journal box is an equalizer bar 10' on which is seated a truck frame supporting spring 11.

The brake drum 5 as has hereinbefore been mentioned is secured to the axle so as to rotate therewith and as shown is provided with laterally spaced external friction braking faces 12, there being an external circular recess 13 provided between these faces which, for the full circumference of the drum, is constantly in communication with the atmosphere.

Each face 12 for the full circumference of the drum is provided with spaced oppositely extending diagonal grooves 15. These grooves extend from side to side of the face and divide the face into a plurality of friction surfaces 16. At points midway between the sides of the face, where the grooves 15 intersect each other, air conducting outlet ducts 17 are provided which lead from an annular air chamber 18 formed in the drum, which chamber is in communication with spaced radially arranged air inlet ducts 19 which are located adjacent the hub 20 of the drum.

Contained in the chamber 18 are a plurality of spaced radially arranged fins 21 which are preferably formed integral with the side walls of the chamber and which are adapted to force air from the chamber through the ducts 17 to the faces 12 when, as will hereinafter more fully appear, the drum is rotating and the brakes are applied.

For the purpose of covering and uncovering the outer or atmospheric ends of the inlet ducts 19, so as to control the flow of fluid in chamber 18, an annular shutter member 22 is provided which is carried by spaced laterally extending radial arranged bolts 23 having screw threaded connection with the hub 20 of the drum. This member slidably contacts the outer surface of the drum to which the inlet ducts 19 are open and is rotatable a limited distance relative to the drum, the member being provided with arcuate slots 24 for the accommodation of the bolts, which slots provide for such relative movement. Outwardly from the bolts 23 the member is provided with spaced radially arranged openings 25 which are of substantially the same shape and dimensions as the atmospheric end of the inlet ducts 19 and which are spaced apart the same distance as the ducts.

Also carried by the bolts 23 is an annular friction holding plate 26 having a web portion 27 which is provided with circular openings for the accommodation of the bolts. In the spaces between these bolt accommodating openings the web portion 27 of the holding plate is provided with spring tongues 28 which frictionally engage the outer surface of the shutter 22 and urge the member into closed contact with the drum and at the same time urge the plate into closed contact with the heads of the bolts 23. As best shown in Fig. 3 the shutter member 22 may be made of substantially the same diameter as the brake drum and at its outer edge is provided with an outwardly directed annular flange 29, the exterior face of which flange is adapted to be frictionally engaged by a friction shoe 30 associated with the brake rigging which will later be described.

The plate 26 at diametrically opposite sides thereof is provided with a pair of lugs 31 which project laterally beyond the outer face of the plate and to which the inner end of a radially extending leaf spring 32 is riveted or otherwise rigidly secured. The outer end of this spring extends between spaced lugs 33 which are preferably located adjacent the peripheral flange 29 of the shutter member and which are welded or otherwise secured to the member, there being a slight operating clearance between the lugs and the spring to permit the spring to move relative to the lugs under certain operating conditions.

The brake rigging which is shown for the purpose of illustrating the invention is of the type having three pairs of brake shoes, 34, 35 and 36, for braking engagement with each brake drum.

These pairs of brake shoes are radially arranged about the drum, the shoes 34 and 35 being located below the horizontal center line of the drum and at opposite sides thereof, and the shoes 36 being located above the drum.

The brake shoes 36 are pivotally carried by a combined lever and brake rigging supporting member 37 which extends longitudinally of the truck at the inner side of the adjacent wheel, the brake shoes being arranged one at each side of the member and being operatively connected to the member by means of a transversely extending pin 38.

The inner end of this member 37 is pivotally connected to the adjacent transom of the truck by means of a transversely extending pin 39.

The outer end of the member is resiliently carried, in a vertical direction, by a release spring 40 which seats on a spring seat 41 carried by the member and resting on an upper surface of the end piece of the truck frame. For the purpose of stabilizing the member 37 against undue upward movement in response to the usual shocks experienced in service, the member is provided with a spring controlled plunger 42 which engages a lower surface of the end piece of the truck frame.

The brake shoes 34 are arranged one at each side of a vertically disposed live lever 43 and are pivotally connected to such lever intermediate its ends by means of a transversely extending pin 44. For supporting the lever 43 and the brake shoes 34 operatively connected thereto, a pair of hangers 45 are provided which are arranged one on each side of the lever and which at their lower ends carry the pin 44. At their upper ends these hangers are supported by a pin 46 suitably carried by the member 37.

The brake shoes 35 are arranged one at each side of a vertically disposed hanger lever 47 and are pivotally connected to such lever intermediate its ends by means of a transversely extending pin 48. The upper end of this lever is operatively carried by a transversely extending pin 49 suitably carried by the outer end portion of the member 37.

The lower ends of the levers 43 and 47 are operatively connected to each other by means of a bottom connecting rod 50.

The upper end of the lever 43 is operatively connected to one end of a longitudinally extending tension rod 51, which rod at its other end is operatively connected to the outer end of a transversely extending equalizer lever 52. This lever 52 is operatively connected intermediate its ends to the outer end of the push rod 53 of a fluid pressure controlled brake cylinder 54 of the usual type which, in the present embodiment of the invention, is shown located between the wheels and secured to a transom of the truck frame.

The shoe 30 which is adapted to frictionally engage the exterior surface of the flange 29 of the shutter member 22 as hereinbefore mentioned, is carried by one of the ends of the pin 38 which connects the brake shoes 36 to the member 37, and through the medium of this pin the shoe is adapted to be moved into and out of frictional engagement with the flange 29 of the shutter member. In this connection it will be noted that the back of the shoe is provided with a vertically disposed upwardly extending projection 55 which passes through an accommodating opening 56 provided in the pin 38 and which, immediately above the pin, is provided with a cotter pin 57 that engages the upper sides of the pin and thereby limits downward movement of the shoe relative to the pin.

Interposed between and operatively engaging the under side of the pin 38 and the back of the shoe 30 is an initially tensioned loop spring 58 which, when the shoe is out of engagement with the shutter member, acts to exert a downwardly directed pressure on the shoe to maintain the cotter pin 57 in close engagement with the pin 38, thereby preventing the shoe from chattering when the brakes are in their release condition. This spring also serves to limit the pressure applied to the shoe 30 when the brakes are applied.

*Operation of the mechanism*

When the wheel and axle assembly and brake drum are rotating and it is desired to effect an application of the brakes, fluid under pressure is admitted to the brake cylinder 54 causing the brake cylinder to operate to move the brake cylinder push rod 53 and connected equalizing lever 52 outwardly, and this lever, acting through the medium of the tension rod 51, moves the live lever 43 forwardly until the brake shoes 34 engage the faces 12 of the brake drum. Further movement of the brake cylinder push rod and equalizer lever now causes the live lever to rock about the pin 44 in a clockwise direction as viewed in Fig. 2 so that the live lever acts through the medium of the bottom connection rod 50 to move the hanger lever toward the drum thereby bringing the brake shoes 35 into braking engagement with the faces 12 of the drum. With the brake shoes 34 and 35 in frictional braking engagement with the brake drum, the brake shoes will move downwardly along the faces 12, so that the shoes acting through the medium of the hangers 45 and hanger lever 47 will cause the member 37 to move downwardly about its pivotal connection with the truck frame and thereby bring the brake shoes 36 into supporting and braking engagement with the faces 12 of the drum. It should here be mentioned that the shoe 30 will engage the flange 29 of the shutter member 22 before the faces of the brake shoes 35 engage the faces 12 of the drum, the looped spring limiting the pressure applied to the shoe while the brake shoes 35 are being moved. With the shoe 30 in engagement with the flange 29, the rotative speed of the member will be temporarily reduced below that of the drum, with the result that the drum will overrun the member until such time as the bolts 23, which rotate with the drum, reach the ends of the slots 24 and thereby pick up the member and cause it to rotate with the drum. This relative movement between the drum and member causes the inlet ducts 19 of the drum to register with the openings 25 of the shutter member so that air is now admitted to the chamber 18 and by the action of the rotating fins 18 is discharged to the atmosphere through the ducts 17, such flow of air dissipating heat from the drum. It will here be noted that since the ducts pass under the brake shoes the air flowing from the ducts will pass to each side of each face 12 through the grooves 15 and will dissipate heat from the brake shoes as well as from the faces of the drum. The loose particles worn from the shoes and drum will find their way into these grooves and will be carried away by the air flowing therethrough. From this it will be seen that the brake drum and all of the brake shoes will be maintained comparatively cool and clean thus materially increasing the efficiency of the brake over the drum brakes heretofore employed where the dissipation of heat and removal of dirt was not provided for.

This over-running of the wheel with relation to the shutter member 22 causes the leaf springs 32 to be flexed, so that, when in releasing the brakes, the shoe 30 is moved out of engagement with the flange 29 the springs will cause the shutter member to rotate relative to the wheel in the direction of travel of the wheel to its normal position with relation to the wheel and cover the inlet ducts 19 and thereby prevent the flow of air into the chamber 18. The member 22 will then rotate at the same rate of speed as the wheels, the force of the spring tongues 28 of the plate 26 being great enough to prevent relative movement between the plate and member, so that, as long as brakes remain released, the ducts are maintained closed.

With the supply of air cut off from the chambers 18 the fins 21 are relieved of their work, and as a result no longer oppose rotation of the drum 5 and the parts driving it.

Modifications in the structure illustrated and described may be made without departing from the spirit and scope of my invention, and I do not therefore wish to be limited otherwise than by the scope of the appended claims.

Having now described my invention, what I claim as new and desire to secure by Letters Patent is:

1. In a brake drum having an exterior braking face for frictional braking engagement by a braking element, in combination, an air chamber in said drum, an air inlet duct leading from the atmosphere to said chamber, an air outlet duct leading from said chamber through said exterior braking face to the atmosphere, means in said chamber for drawing air into said chamber through said inlet duct and for discharging it through said outlet duct for dissipating heat from the drum, and a shutter movably carried by the drum and having a position with relation to the drum for cutting off the flow of air through said drum and having another position with relation to the drum for permitting the flow of air through the drum.

2. In a brake drum having an exterior braking face for frictional braking engagement by a braking element, in combination, an air chamber in said drum, an air inlet duct leading from the atmosphere to said chamber, an air outlet duct leading from said chamber to said exterior braking face to the atmosphere, means in said chamber for drawing air into said chamber through said inlet duct and for discharging it through said outlet duct for dissipating heat from the drum, and a shutter movably carried by the drum and having a position with relation to the drum for closing said inlet duct for cutting off the flow of air through said drum and having another position with relation to the drum for opening said ducts for permitting the flow of air through the drum.

3. In a brake drum having an exterior braking face for frictional braking engagement by a braking element, in combination, a circular air chamber in said drum encircling the hub thereof, an air inlet duct adjacent said hub extending laterally of the drum and opening into said chamber, an air outlet duct extending outwardly from the chamber and through said braking face to the atmosphere at right angles to the axis of the drum, means in said chamber rotatable with the drum for drawing air through said inlet duct to said chamber and for discharging it through said outlet duct for dissipating heat from the drum, and a vertically disposed shutter having a lost motion connection with said hub to permit the drum and shutter to assume a position relative to each other to cut off the flow of air through the drum and to assume another position to permit the flow of air through the drum.

4. In a drum brake mechanism, in combination, a rotatable brake drum having an exterior braking face, a friction brake element adapted to be moved into and out of braking engagement with said braking face, a cooling system for said drum, said system being wholly embodied in the drum, means carried by the drum having a position with relation thereto for cutting the cooling system into action when an application of the brakes is being effected, and having another position with relation thereto for cutting the cooling system out of action when the brakes are being released, and means operative with the brake element for effecting the positioning of said means.

5. In a drum brake mechanism, in combination, a brake drum having an exterior braking face, grooves extending across the full width of said braking face, a brake element movable into and out of frictional braking engagement with said braking face, said grooves being adapted to collect particles worn away from the face and element when the face and element are in frictional engagement with each other, an air circulating system for cooling said drum and delivering air to said grooves, the air flowing through said grooves when the brake element is in frictional braking engagement with the braking face being adapted to free the grooves of collected foreign matter and for dissipating heat from the brake element and braking face of the drum, means cutting the air circulating system out of action when the brakes are released and for cutting the air circulating system into action when the brakes are applied.

6. In a drum brake mechanism, in combination, a brake drum having an exterior braking face, grooves extending across the full width of said braking face, a brake element movable into and out of frictional braking engagement with said braking face, said grooves being adapted to collect particles worn away from the face and element when the face and element are in frictional engagement with each other, an air circulating system for cooling said drum and for delivering air to said grooves, the air flowing through said grooves when the brake element is in frictional braking engagement with the braking face being adapted to free the grooves of collected foreign matter and for dissipating heat from the brake element and braking face of the drum, shutter means normally cuting said air circulating system out of action, and means operative with said brake element when the element is being moved into braking engagement with said space for controlling said shutter means to cut said air circulating system into action.

7. In a drum brake mechanism, in combination, a brake drum having an exterior braking face, grooves extending across the full width of said braking face, a brake element movable into and out of frictional braking engagement with said braking face, said grooves being adapted to collect particles that are worn away from the face and element when the face and element are in frictional engagement with each other, an air circulating system for cooling said drum and for delivering air to said grooves, the air flowing through said grooves when the brake element is in frictional braking engagement with the braking face being adapted to free the grooves of collected foreign matter and for dissipating heat from the brake element and braking face of the drum, shutter means normally cutting said air circulating system out of action, means operative with said brake element when the brake element is being moved into engagement with said face for controlling said shutter means to cut said air circulating system into action, and means operative when said brake element is being moved out of engagement with said face for controlling said shutter means to cut said air circulating system out of action.

8. The combination with a railway vehicle truck comprising a wheel and axle assembly and a truck frame supported by said assembly, a brake element rotatable with said assembly, braking means movable into braking engagement with said brake element, means movably connected with said truck frame adapted to support said braking means and being movable into braking engagement with the brake element in response to the forces set up by the engagement of said braking means with the brake element, an air circulating system embodied in said brake element for dissipating heat from the element and means, a shutter having a position with relation to the rotatable brake element for cutting the air circulating system out of action and having a different position with relation to the rotatable brake element for cutting the air circulating system into action, and means operable by the means movably carried by the truck frame for controlling the positioning of the shutter.

9. The combination with a railway vehicle truck comprising a truck frame and a supporting wheel and axle assembly, of a brake drum included in said assembly, a clasp brake mechanism operative into braking engagement with said drum, said brake mechanism being movable downwardly when in braking engagement with the drum in response to the forces set up due to the braking action between the mechanism and drum, a support for said clasp brake mechanism carried by said truck frame and movable downwardly by the brake mechanism relative to the truck frame into engagement with the drum, and air circulating system for said brake mechanism and drum, means having a position with relation to the drum for cutting the air circulating system into action and having a position with relation to the drum for cutting the air circulating system out of action, and means operable by said support for controlling the positioning of said means.

10. The combination with a railway truck comprising a truck frame and a supporting wheel and axle assembly, of a brake drum included in said assembly, a clasp brake mechanism operative into braking engagement with said drum, said brake mechanism being movable downwardly when in braking engagement with the drum in response to forces set up due to the braking action between the mechanism and the drum, a support for said clasp brake mechanism carried by said truck frame and movable downwardly by the brake mechanism relative to the truck frame into engagement with said drum and movable out of engagement with said drum when said brake mechanism is moved out of braking engagement with the drum, an air cooling system for said drum and mechanism and carried by said drum, means carried by said drum having a position for cutting the air circulating system into action and having a different position with relation to the drum for cutting the air circulating system out of action, and means operable by said support for effecting the positioning of said means.

11. The combination with a railway vehicle truck comprising a truck frame and a supporting wheel and axle assembly, of a brake drum included in said assembly and having a grooved exterior friction braking face, said braking face being provided with a plurality of grooves extending across said face for its full width, a clasp brake mechanism operative into braking engagement with said face, said brake mechanism being movable downwardly when in braking engagement with the face in response to the forces set up due to the braking action between the mechanism and the face, a support for said clasp brake mechanism carried by said truck frame and movable downwardly by the brake mechanism relative to the truck frame into frictional engagement with said face, means included in the drum operative to circulate air through said drum and to conduct the circulating air to said grooves, the flow of air through said grooves when the brake mechanism and support are in frictional engagement with said face being adapted to dissipate heat from the inner engaging friction faces of the brake mechanism and support and face and freeing the grooves of particles worn from the friction faces and deposited in the grooves.

CLYDE C. FARMER.